May 10, 1966 J. A. MAASS 3,250,919

AMPLITUDE LIMITER USING TUNNEL DIODES

Filed May 4, 1962

INVENTOR,
JOACHIM A. MAASS.

BY Jack H. Linscott

ATTORNEY.

United States Patent Office 3,250,919

Patented May 10, 1966

3,250,919

AMPLITUDE LIMITER USING TUNNEL DIODES

Joachim A. Maass, Wall Township, Monmouth County, N.J., assignor to the United States of America as represented by the Secretary of the Army Filed May 4, 1962, Ser. No. 192,607
3 Claims. (Cl. 307—88.5)
(Granted under Title 35, U.S. Code (1952), sec. 266)

The invention described herein may be manufactured and used by or for the Government for governmental purposes, without the payment of any royalty thereon.

The invention relates to limiters and particularly to diodes used as amplitude limiters. More particularly this invention relates to a limiter that may be used in conjunction with filters or tuned circuits.

Limiters are usually considered in terms of the application of the saturation characteristics of a device, or circuit element, beyond its linear range. The most popular and simplest form of limiters are diodes, usually connected across the output of the signal source. Single diodes may be used for unidirectional limiting, or pairs of diodes may be used for bidirectional limiting. According to the desired limiter characteristic, various circuit configurations for diode pairs may be used; e.g., an antiparallel connection or—making use of the breakdown characteristic as well—a series, back-to-back connection.

The limiting action may be gradual or sharp, but in all cases the limiting level is approached asymptotically, and the amplitude of the limited signal is substantially the same for all input amplitudes that exceed the limiting level.

This means that, unless the limiting level is very close to the zero signal level, or the signal amplitude is very high, the limited signals may vary in wave form anywhere from the sine wave of the input to a square wave, and, even though the varying wave form signals have a constant amplitude, they may be lost through filtering action. This is due to the fact that the amplitude of the fundamental frequency of a square wave is $\gamma/\pi$ times that of a sine wave having the same amplitude as the square wave. In other words, the amplitude modulation is partly restored by filtering the constant-amplitude, limited signals of varying wave form since the filtered output amplitude of a square wave will be $\gamma/\pi$ times greater than the filtered output amplitude of a sine wave of the same, initial, constant-amplitude, limited level.

The effectiveness of the limiting may be improved by clipping very close to the zero line, or providing additional stages of amplification and clipping. This usually requires additional circuitry and introduces other sources of error. In any case this results in an almost complete loss of the original signal energy and in comparative inefficiency.

It is therefore an object of this invention to provide an improved diode limiter.

It is a further object of this invention to provide a diode limiter that can maintain the amplitude of the fundamental frequency of the limited signals at a constant level over a wide range of input signal amplitudes.

It is a further object of this invention to provide an improved diode limiter that provides a limited signal that can be filtered without restoring any of the original amplitude modulation component.

These and other objects are accomplished by connecting two tunnel diodes in series with a source of input signals and an output load. Additional, conventional limiters may be provided across the source of input signals to increase the dynamic range of the overall device.

This invention will be better understood and other and further objects of this invention will become apparent from the following specification and the drawings, of which;

Figure 1:
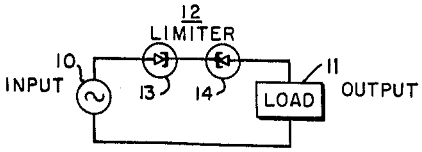
FIGURE 1 is a block and circuit diagram of the basic limiter.

Referring now more particularly to FIGURE 1, the source of input signals 10 is connected through the limiter 12, which consists of the tunnel diodes 13 and 14, back to back, in series with the load 11.

Figure 2:
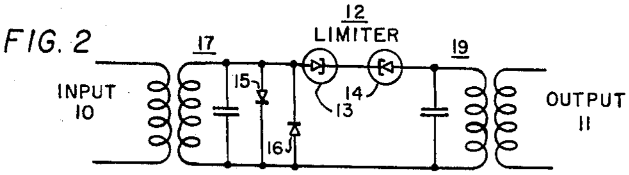
FIGURE 2 is a circuit diagram including the basic limiter and an auxiliary limiter.

FIGURE 2 shows the same limiter 12 with a typical input tuned circuit 17, inductively coupled to the source of input signals 10 and a typical output tuned circuit 19 inductively coupled to the output load 11. The limiter again comprises the two tunnel diodes 13 and 14, connected back to back in series with the source of input signals and the output load. An additional, conventional limiter consisting of the diodes 15 and 16, connected across the source of input signals, is also included to improve the dynamic range of the overall circuit.

The operation of these circuits, and their advantages over the conventional limiters will be better understood by comparison of the characteristic curves of the input voltage with respect to output voltage of both the conventional diode limiters and those used in this circuit.

Figure 3:
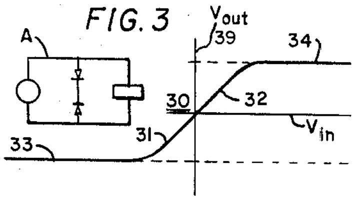
FIGURES 3 and 4 show the characteristic curves of input voltage with respect to output voltage of a conventional limiter and of the limiter of this invention.

In FIGURE 3 the effect of one of the diodes of a conventional limiter is represented by the curve on one side of the vertical axis 39, and the effect of the other diode is represented by the curve on the other side of the vertical axis. The curve 30 represents the overall effect of both of the diodes.

In this case Zener diodes are used and are connected in a conventional way as illustrated by the combined block and circuit diagram insert A in FIGURE 3. The standard diode limiter 15 and 16 of FIGURE 2 would have a similar effect. In both cases a substantial source impedance is assumed.

Figure 4:
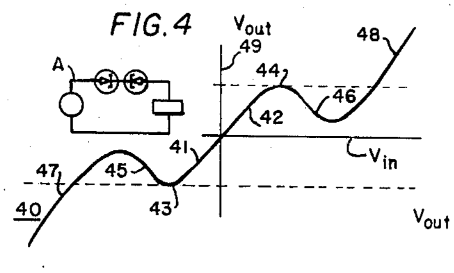

In FIGURE 4 the effect of one of the tunnel diodes of this new limiting circuit is again represented by the curve on one side of the vertical axis 49 and the effect of the other tunnel diode is represented by the curve on the other side of the vertical axis. The curve 40 represents the overall effect of the two tunnel diodes, which are connected as shown in the combination block and circuit diagram of FIGURE 4A, which is the same as the circuit of FIGURE 1.

Figure 5:
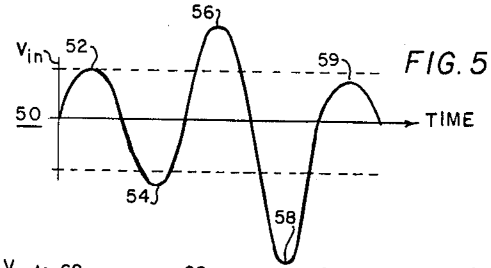
FIGURES 5 through 9 show wave forms of typical input signals and of the effect of the various limiting and filtering actions on the typical input signals.

To illustrate the comparison between the limiting action of a conventional diode circuit, such as that of FIGURE 3A and the circuit of this invention shown in FIGURE 4A, an incoming signal with a wave form such as that of 50 of FIGURE 5 will be considered. If a signal having this wave form is applied to a conventional diode limiter such as seen in FIGURE 3A, the output voltage increases linearly with respect to the input voltage wave form through the voltage range corresponding to the portions 31 and 32 of the curve. As the input voltage goes beyond this level, the output voltage levels off, corresponding to the portions 33 and 34 of the curve.

Figure 6:
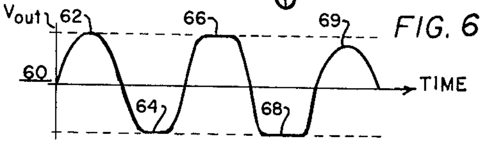

This produces a wave form as shown in 60 of FIGURE 6 with increasingly flattened tops 64, 66, and 68 corresponding to the increasing amplitudes of the sine waves 54, 56, and 58 of FIGURE 5.

Figure 7:
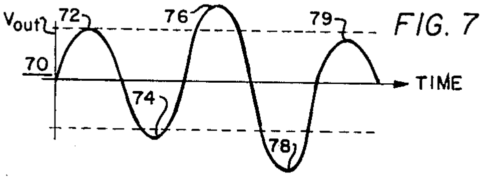

If these wave forms of FIGURE 6 are passed through filters which attenuate all the harmonics higher than the fundamental frequency, the output amplitude will be equal to the fundamental content of the wave form of FIGURE 6. This would amount to restoring a certain percentage of the original amplitude modulation, as suggested by the wave form 70 of FIGURE 7 with its peaks 74, 76, and 78 rising above the level of the original limiting.

If a signal having the same wave form as in FIGURE 5 is applied to the circuit of FIGURE 1, 2, or 4A the output voltage will be modified in accordance with the characteristic curve shown in FIGURE 4. The response will be linear along the portions 41 and 42, but will reverse at the points 43 and 44 to continue with a negative characteristic along the portions 45 and 46. A positive characteristic is again resumed along the portions 47 and 48. This will produce a wave form such as 80 of FIGURE 8.

Figure 8:
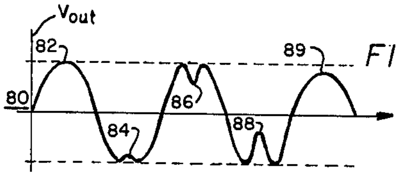

In this case, as the input voltage goes beyond the limiting level which is the level of the points 43 and 44, the output voltage will decrease with an additional increase in the input signal voltage to produce the inverted peaks 84, 86, and 88 of FIGURE 8.

Figure 9:
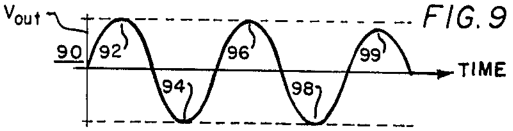

The wave form has reduced energy at the fundamental frequency and when the signals of this wave form are filtered, the resulting waves, which are seen in 90 of FIGURE 9, have peak values 94, 96, and 98 which are no higher than the original limiting level.

This effect will be had until the incoming signal strength exceeds the amplitude corresponding to that of the portions 45 and 46 of the curve. However, the dynamic range of this circuit can be increased by an additional, conventional limiter such as is formed by the diodes 15 and 16 of FIGURE 2. These can be adjusted to limit the amplitude of an increasing signal voltage—applied to the series limiter—to a level that will not exceed that of the portions 45 and 46 of FIGURE 4. This will hold the amplitude variations of the signal within the range corresponding to the portions 41 through 46 of the curve, to insure the effective functioning of this circuit.

The effective range of operation of this circuit may be extended somewhat by the connection of a bias voltage, not shown, in a manner well known in the art, across one or both of the diodes. For example, a biasing voltage could be added from the connection between the two diodes 13 and 14 of FIGURE 1 to the connection between the input and the output load. One polarity of bias voltage will increase the effective limiting voltage level and the other polarity of bias voltage will decrease it.

It should also be noted that this circuit will operate for unidirectional pulses with only one tunnel diode. The circuit, in this case, must be direct coupled so that the amplitude modulated sine wave, the limiting of the sine wave according to this invention, and any subsequent filtering of the limited sine wave must be with respect to a constant voltage level and in one direction only.

In the typical embodiment of this invention, as shown in FIGURE 2 the diodes 13 and 14 are type IN 2939 tunnel diodes, made by the General Electric Corporation, with input and output impedance of about 50 ohms providing a limiting level of one-half volt. The diodes 15 and 16 are the standard, type IN 281 diodes.

What is claimed is:

1. A limiter comprising the series-connected combination of; a source of input signals to be limited; an output load; and a first and second tunnel diodes connected, back-to-back.

2. A limiter comprising a first and second tunnel diodes, each having an anode and a cathode; a source of input signals to be limited; an output load; the cathode of said first tunnel diode connected to the cathode of said second tunnel diode; one of the terminals of said source of input signals connected to the anode of one of said tunnel diodes; one of the terminals of said output load connected to the anode of the other of said tunnel diodes; the other of the terminals of said source of input signals connected to the other of the terminals of said output load; a third and fourth diodes, each having an anode and a cathode; the anode of said third diode and the cathode of said fourth diode connected to one terminal of said source of input signals; and the cathode of said third diode and the anode of said fourth diode connected to the other terminal of said source of input signals.

3. A limiter as in claim 2 wherein said third and fourth diodes are Zener diodes.

References Cited by the Examiner

UNITED STATES PATENTS

| | | | |
|---|---|---|---|
| 3,054,071 | 9/1962 | Tieman | 307—88.5 |
| 3,061,744 | 10/1962 | Spira | 307—88.5 X |
| 3,111,593 | 11/1963 | Kaenel | 307—88.5 |
| 3,122,608 | 2/1964 | Taylor | 307—88.5 X |
| 3,124,648 | 3/1964 | Miller | 307—88.5 X |
| 3,129,342 | 4/1964 | Kaenel | 307—88.5 |
| 3,139,533 | 6/1964 | Midkiff | 307—88.5 |
| 3,158,756 | 11/1964 | Brunner et al. | 307—88.5 |
| 3,160,823 | 12/1964 | Christensen | 307—88.5 X |
| 3,202,912 | 8/1965 | Chynoweth et al. | 307—88.5 X |
| 3,210,670 | 10/1965 | Jones | 307—88.5 X |
| 3,211,921 | 10/1965 | Kaufman et al. | 307—88.5 |

ARTHUR GAUSS, *Primary Examiner.*

J. JORDAN, *Assistant Examiner.*

UNITED STATES PATENT OFFICE
CERTIFICATE OF CORRECTION

Patent No. 3,250,919 May 10, 1966

Joachim A. Maass

It is hereby certified that error appears in the above numbered patent requiring correction and that the said Letters Patent should read as corrected below.

Column 1, lines 41 and 46, for "$\gamma/\pi$" read -- $4/\pi$ --.

Signed and sealed this 5th day of September 1967.

(SEAL)
Attest:

ERNEST W. SWIDER
Attesting Officer

EDWARD J. BRENNER
Commissioner of Patents